(12) United States Patent
Suwa

(10) Patent No.: US 7,222,894 B2
(45) Date of Patent: May 29, 2007

(54) BUMPER FACE FASTENING STRUCTURE

(75) Inventor: Takaki Suwa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 169 days.

(21) Appl. No.: 11/175,416

(22) Filed: Jul. 6, 2005

(65) Prior Publication Data

US 2006/0017311 A1    Jan. 26, 2006

(30) Foreign Application Priority Data

Jul. 21, 2004   (JP)   ............... 2004-213196

(51) Int. Cl.
 *B60R 19/02*   (2006.01)
(52) U.S. Cl. ....................................... 293/102
(58) Field of Classification Search ........... 293/102, 293/154, 155
 See application file for complete search history.

(56) References Cited

U.S. PATENT DOCUMENTS 4,974,891 A * 12/1990 Furuta ................... 293/104

6,893,064 B2 * 5/2005 Satou ..................... 293/132

FOREIGN PATENT DOCUMENTS

JP    2003-341561    12/2003

* cited by examiner

*Primary Examiner*—H Gutman
(74) *Attorney, Agent, or Firm*—Rankin, Hill, Porter & Clark LLP

(57) ABSTRACT

A fastening structure is provided which mounts a spoiler between a front bumper face and an under cover. The front bumper face has a lower end portion disposed in overlapping relation to a front end part of the under cover such that the lower end portion of the front bumper face is located below the front end part of the under cover. Downwardly projecting spacer portions are formed on an under surface of the front end part. When the lower end portion of the front bumper face and the front end part of the under cover overlap each other, the lower end portion of the front bumper face and the front end part of the under cover are spaced from each other by the spacer portions to define a clearance therebetween. The spoiler has a mounting portion retained in the clearance.

3 Claims, 6 Drawing Sheets

BUMPER FACE FASTENING STRUCTURE

FIELD OF THE INVENTION

The present invention relates generally to a bumper face fastening structure, and in particular to a fastening structure for fastening a bumper face to an under cover with a spoiler interposed therebetween.

BACKGROUND OF THE INVENTION

Some automobiles have a spoiler for changing a flow of air around an automobile body during running of the automobile. A mounting structure for mounting a spoiler to a lower part of a front bumper is known from, for example, JP-A-2003-341 561. The disclosed structure will be discussed with reference to FIG. 7 hereof.

Referring to FIG. 7, a conventional spoiler mounting structure 100 includes a front bumper 101 and a spoiler (air dam) 105. The front bumper 101 has a forward projecting portion 103 connected to a lower end portion 102 thereof. The spoiler 105 has a mounting part 106 mounted to the forward projecting portion 103.

The forward projecting portion 103 and the lower end portion 102 of the front bumper 101 jointly define an accommodating portion 107 accommodating therein an upper portion 108 of the mounting part 106. The mounting part 106 has a lower portion 109 disposed under the forward projecting portion 103. The lower portion 109 has a rearwardly extending portion 110.

The extending portion 110 has an engagement hole 111. The front bumper 101 has a rearward projecting portion 112 extending rearwardly from a rear end of the forward projecting portion 103. The rearward projecting portion 112 has a hook-shaped engagement projection 113. With the engagement projection 113 engaged with the engagement hole 111, the spoiler 105 is mounted to a lower portion of the front bumper 101.

An automobile including the structure 100 may take two forms, one of which is equipped with the spoiler 105, and the other of which is not equipped with the same. When the automobile takes the other form, that is, the automobile is not equipped with the spoiler 105, the spoiler 105 needs to be removed from the lower end portion 102 of the front bumper 101.

With the spoiler 105 removed from the lower end portion 102 of the front bumper 101, the forward projecting portion 103, the accommodating portion 107 and the engagement projection 113 all of which are located at a lower part of the front bumper 101 are exposed to an outside of the automobile. The exposed portions 103, 107, 113 are likely to adversely affect air flow around an automobile body during running of the automobile, as well as to provide unpleasant appearance of the automobile.

To address the above problem, the automobile which is not equipped with the spoiler 105 is required to use another type of front bumper including none of the forward projecting portion 103, the accommodating portion 107 and the engagement projection 113. This means that there should be provided two types of the front bumper, one used for the automobile equipped with the spoiler 105, and the other used for the automobile not equipped with the spoiler 105. This results in an increase in the number of components of the automobile. Further, maintenance operation on such an increased number of components is difficult to easily perform. Furthermore, the increase in the number of components makes it difficult to reduce the number of steps for assembling the automobile. There is a demand for a front bumper applicable to both an automobile equipped with a spoiler and an automobile not equipped with the spoiler.

SUMMARY OF THE INVENTION

According to one aspect of the present invention, there is provided a bumper face fastening structure comprising: an under cover provided in a lower part of an engine compartment; a bumper face having a lower end portion disposed in overlapping relation to a front end part of the under cover; fasteners for fastening together the front end part of the under cover and the lower end portion of the bumper face; spacer portions provided between the front end part of the under cover and the lower end portion of the bumper face and having through-holes formed therein for allowing the fasteners to be inserted through the through-holes; a spoiler removably mounted between the front end part of the under cover and the lower end portion of the bumper face; and the fasteners being inserted through the through-holes to fasten together the front end part of the under cover and the lower end portion of the bumper face with a clearance defined between the front end part of the under cover and the lower end portion of the bumper face, the spoiler having a mounting portion located in the clearance, the spacer portions being fitted through fitting holes formed in the mounting portion of the spoiler to retain the mounting portion of the spoiler in the clearance.

The spacer portions are formed on the front end part of the under cover or on the lower end portion of the bumper face for defining the clearance between the front end part of the under cover and the lower end portion of the bumper face. The mounting portion of the spoiler is located in the clearance. The spacer portions are fitted through the fitting holes of the mounting portion to retain the mounting portion in the clearance. For a vehicle equipped with the spoiler, the spoiler can mounted to the lower end portion of the bumper face with the mounting portion retained between the front end part of the under cover and the lower end portion of the bumper face.

For a vehicle not equipped with the spoiler, the clearance can be defined by the spacer portions between the front end part of the under cover and the lower end portion of the bumper face. The vehicle not equipped with the spoiler can use the same under cover and bumper face as the vehicle equipped with the spoiler.

Thus, the bumper face and under cover can be commonly used for both the vehicle equipped with the spoiler and the vehicle not equipped with the spoiler. This results in reduction in the number of components, in facilitation of maintenance of the components and in reduction in the number of steps for assembling the vehicle.

Preferably, the lower end portion of the bumper face extends in a rearward direction of a vehicle body and is located below the front end part of the under cover. Thus, the clearance between the front end part of the under cover and the lower end portion of the bumper face can be provided inside the vehicle body. Namely, the clearance between the front end part of the under cover and the lower end portion of the bumper face can be hidden by the bumper face. Accordingly, air flow around the vehicle body during the running of the vehicle is not adversely affected. Additionally, the vehicle body can have its improved outer appearance.

Preferably, the spoiler includes locking lugs, and the under cover has locking holes formed therein for allowing the locking lugs to be inserted through the locking holes. The spoiler can be locked to the under cover by the locking lugs of the spoiler inserted through the locking holes of the under cover. Thus, the mounting portion of the spoiler can be readily retained between the front end part of the under cover and the lower end portion of the bumper face. The facilitation of the mounting operation of the spoiler can be achieved.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENTS

Figure 1:
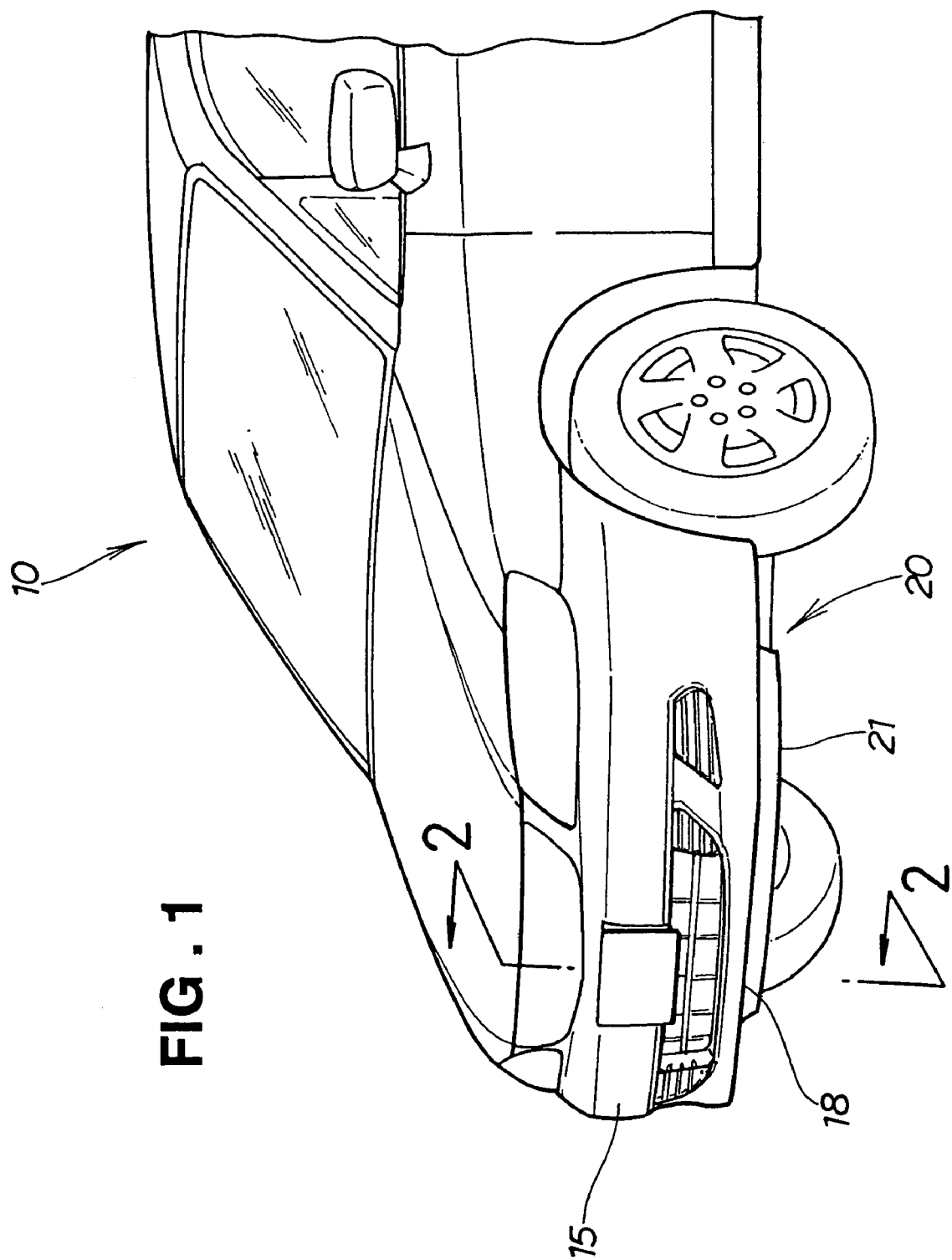
FIG. 1 is a perspective view of a vehicle including a bumper face fastening structure according to the present invention.

A vehicle 10 shown in FIG. 1 includes a bumper face fastening structure 20 according to the present invention. The bumper face structure 20 includes a front bumper face (bumper face) 15 provided at a front part of the vehicle 10, and a spoiler (air dam) 21 located at a lower end portion 18 of the front bumper face 15.

Figure 2:
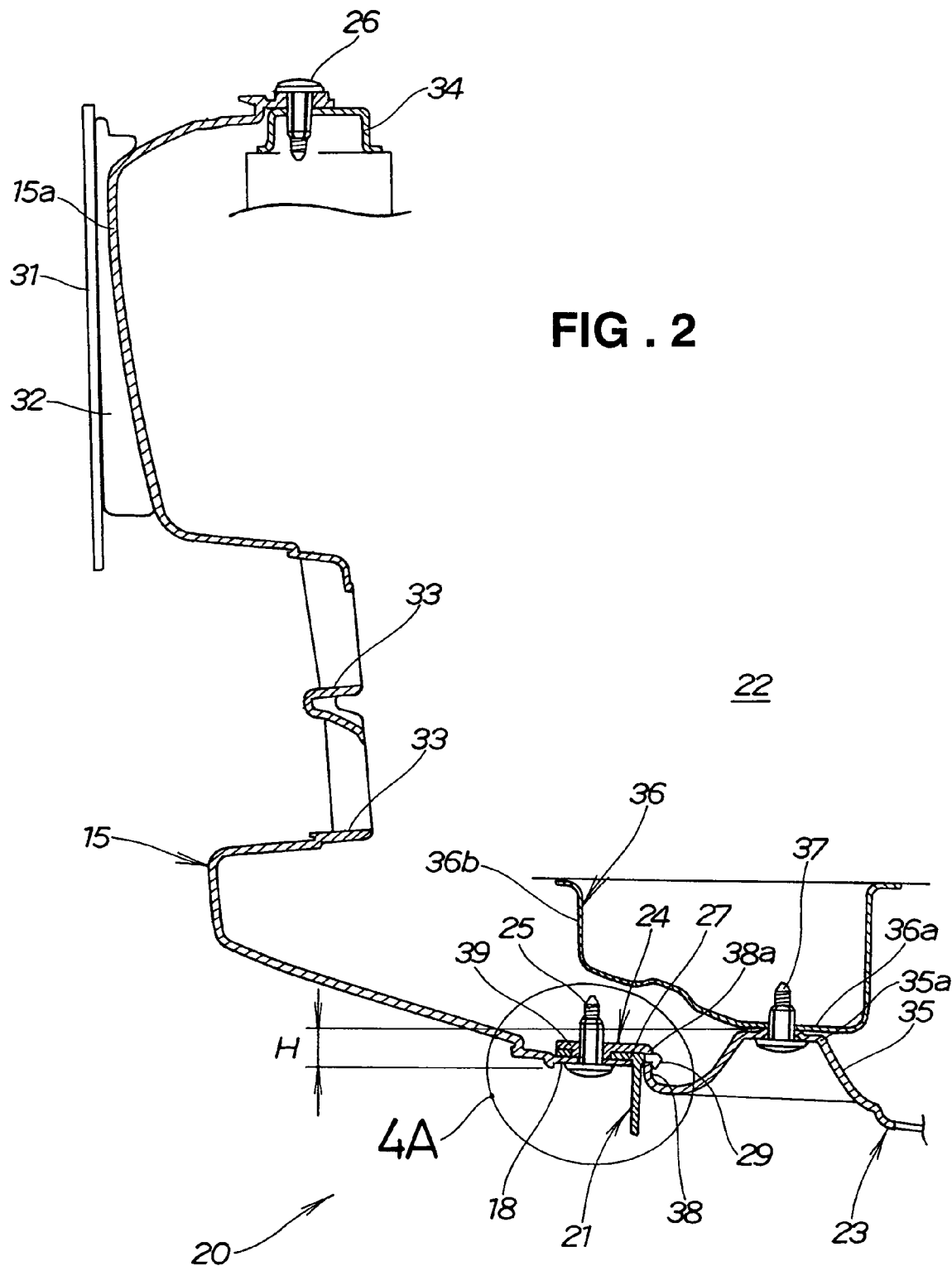
FIG. 2 is a cross-sectional view taken along line 2-2 of FIG. 1.

As shown in FIG. 2, an under cover 23 is provided in a lower part of an engine compartment 22. The bumper face 15 has the lower end portion 18 which a front part 24 of the under cover overlaps. The lower end portion 18 and the front end part 24 disposed in overlapping relation to each other are fastened together by means of plural clips (fasteners) 25. The clip 25 is a conventionally used one.

The spoiler 21 for changing an air flow is mounted between the front end part 24 of the under cover 23 and the lower end portion 18 of the front bumper face 15.

The front bumper face 15 is a bumper cover for covering a front bumper beam (reinforcing member) 34 forming one part of a vehicle body of the vehicle 10.

The front bumper face 15 has an upper end portion fastened to the bumper beam 34 by means of a clip 26. The front bumper face 15 has an upper part having a transverse center 15a to which a license plate 31 is attached through a base 32. Formed below the license plate 31 are plural air intake ports 33. The clip 26 is the same as the clip 25.

The under cover 23 has an upwardly projecting portion 35 located in the vicinity of the front end part 24 of the under cover 23. The upwardly projecting portion 35 abuts against a bottom portion 36a of a front bulkhead lower cross member 36. The upwardly projecting portion 35 abutting against the bottom portion 36a is attached to the bottom portion 36a by means of plural clips 37. The clip 37 is the same as the clip 25.

The under cover 23 is provided in the lower part of the engine compartment 22. Thus, an engine, a transmission, accessorial components and the like within the engine compartment 22 are protected by the under cover 23.

The front end part 24 of the under cover 23 includes a vertical portion 38 extending generally vertically upwardly from a front end of the upwardly projecting portion 35, and a horizontal portion 39 extending generally horizontally forwardly from a top end 38a of the vertical portion 38.

The bumper face fastening structure 20 is arranged such that a mounting portion 27 of the spoiler 21 is mounted between the lower end portion 18 of the front bumper face 15 and the front end part 24 of the under cover 23 overlapping the lower end portion 18. A location for mounting the spoiler 21 is lower in level than a bottom of the vehicle body (the bottom portion 36a of the front bulkhead lower cross member 36).

The upwardly projecting portion 35 located in the vicinity of the front end part 24 of the under cover 23 has a top end portion 35a located at a higher level than the front end part 24, more specifically, the horizontal portion 39 of the front end part 24 of the under cover 23. With the top end portion 35a of the upwardly projecting portion 35 abutting against the bottom portion 36a of the front bulkhead lower cross member 36, the top end portion 35a is attached to the bottom portion 36a by means of the clips 37.

The front end part 24, more specifically, the horizontal portion 39 of the under cover 23 is located a distance H lower than the bottom portion 36a of the front bulkhead lower cross member 36. Since the location for mounting of the spoiler 21 is low, the spoiler 21 can be more effectively used.

The distance H may be optionally varied by adjustment of amount of upward projection of the upwardly projecting portion 35.

A location for mounting a spoiler (air dam) is normally higher in level than a bottom of a vehicle body (a bottom portion of a front bulkhead lower cross member).

Figure 3:
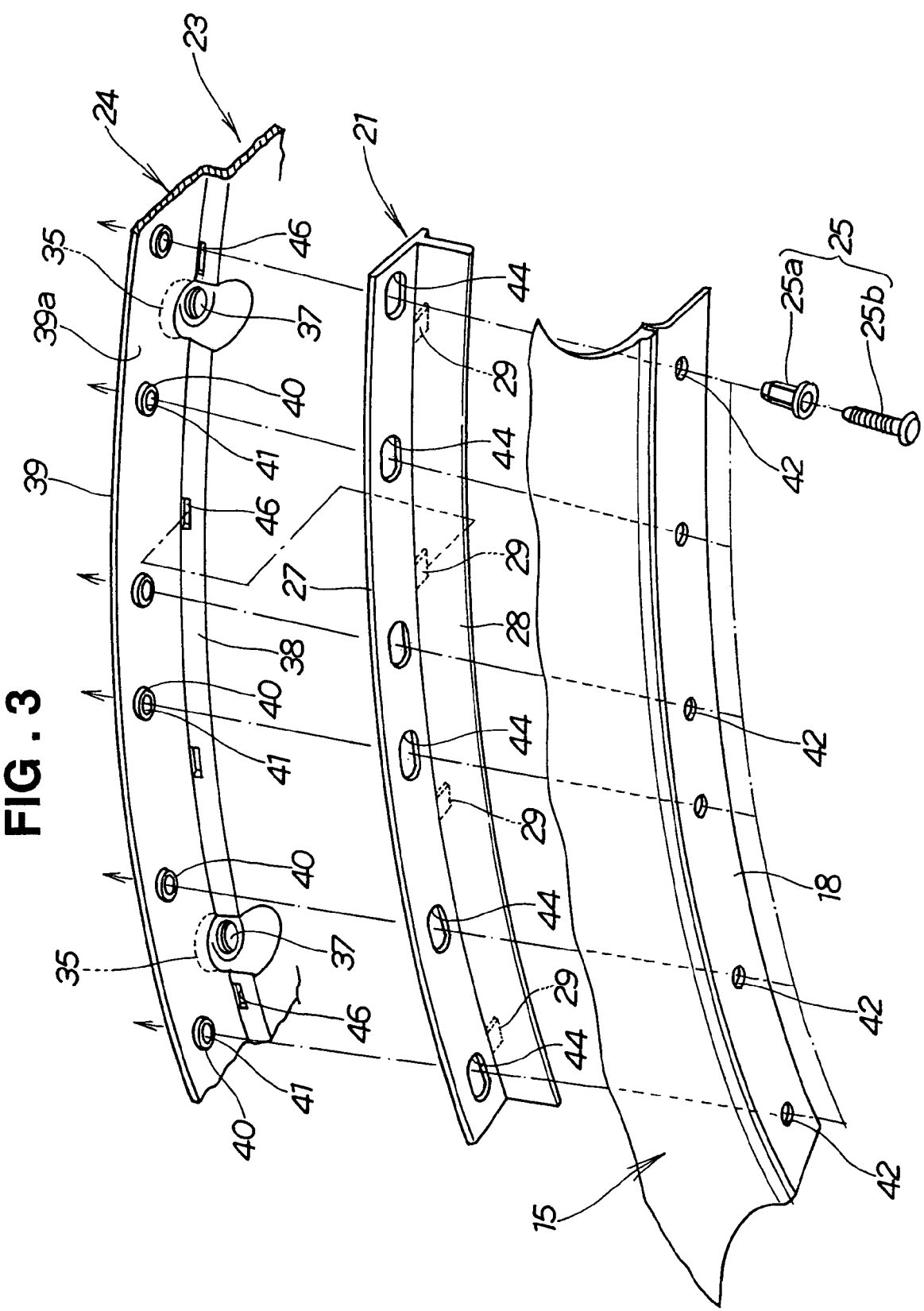
FIG. 3 is a perspective view of a front bumper face, a spoiler and an under cover shown in FIG. 2, all of which are disassembled.

FIG. 3 is an exploded perspective view of the bumper face fastening structure of the present invention with the spoiler 21, the front bumper face 15 and the under cover 23 disassembled.

The horizontal portion (front end portion) 39 of the under cover 23 has plural (six) spacer portions 40 formed integrally with an under surface 39a of the horizontal portion 39. Each spacer portion 40 has a through-hole 41 formed centrally thereof for insertion of the clip 25 through the through-hole 41.

Figure 4A:
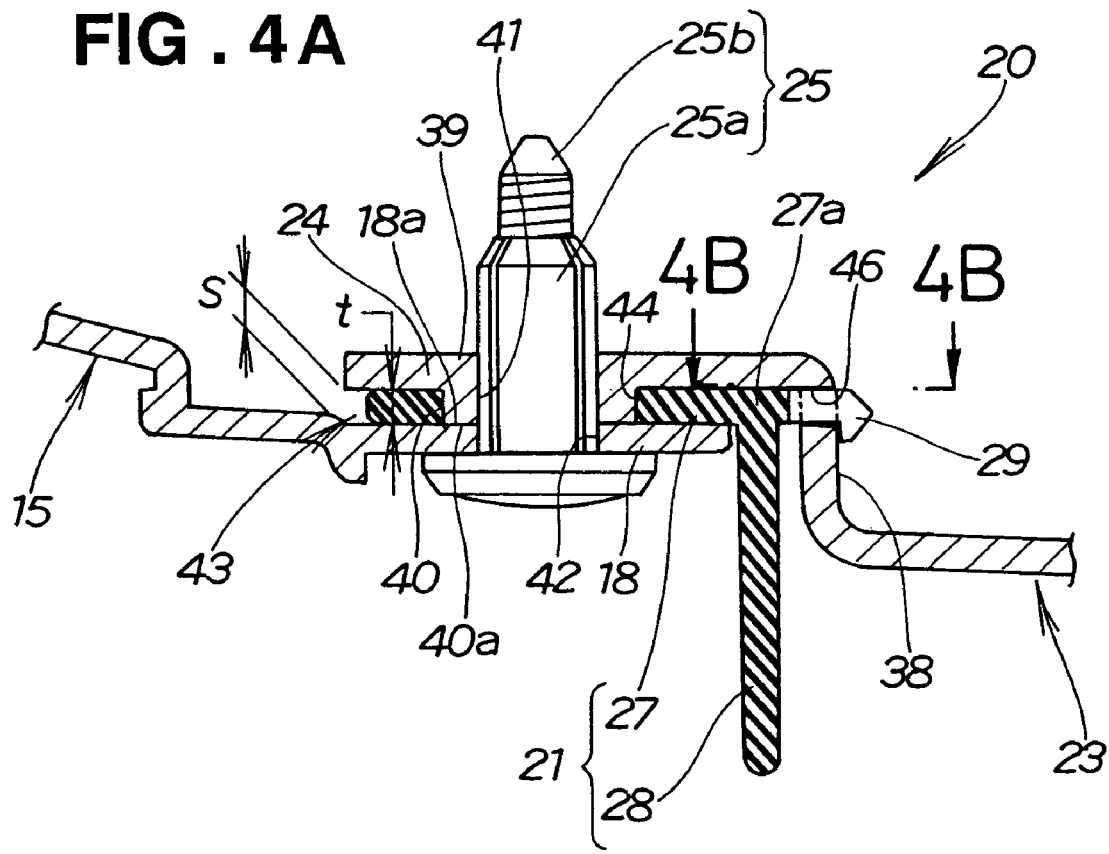
FIG. 4A is a view showing, on enlarged scale, a part of FIG. 2 encircled by a circle designated by a reference numeral 4A.

As shown in FIG. 4A, the lower end portion 18 of the front bumper face 15 lies under the horizontal portion 39 of the under cover 23 with the spacer portions (only one shown in FIG. 4A) 40 interposed between the lower end portion 18 and the horizontal portion 39 to define a clearance 43 between the lower end portion 18 and the horizontal portion 39. The horizontal portion 39 and the lower end portion 18 are fastened together by the clips 25 each being inserted through a mounting hole 42 formed in the lower end portion 18 and the through-hole 41 formed in the spacer portion 40.

The mounting portion 27 of the spoiler 21 is located within the clearance 43. The mounting portion 27 is retained within the clearance 27 by the spacer portions 40 being fitted through respective fitting holes 44 formed in the mounting portion 27.

The mounting portion 27 of the spoiler 21 is located between the horizontal portion 39 of the under cover 24 and the lower end portion 18 of the front bumper face 15. The mounting portion 27 is located beneath the under surface of the horizontal portion 39.

The vertical portion 38 is provided along a rear edge of the horizontal portion 39. The vertical portion 38 has plural (four) locking hole portions 46 formed along a top edge thereof at predetermined intervals. The spoiler 21 has plural locking lugs 29 to be inserted through the respective locking hole portions 46 when the mounting portion 27 is to be disposed under the horizontal portion 39.

Figure 4B:
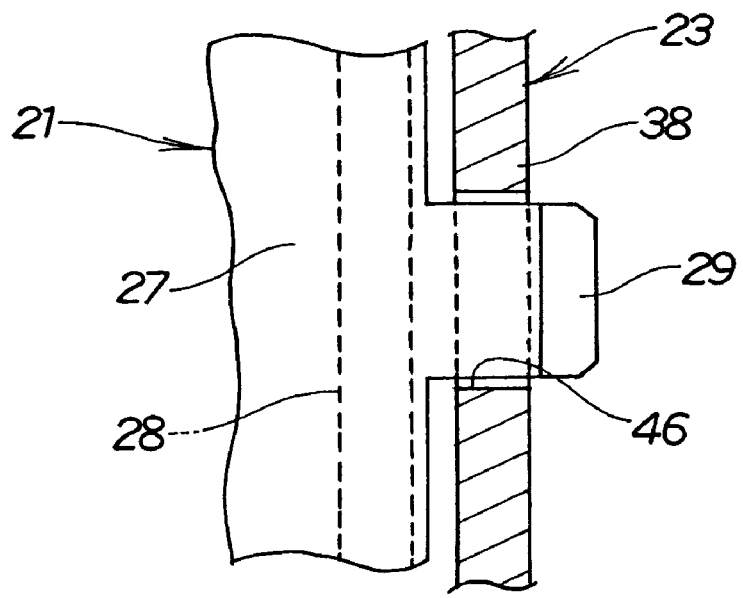
FIG. 4B is a cross-sectional view taken along line 4B-4B of FIG. 4A.

FIG. 4A shows on enlarged scale the bumper face fastening structure 20 shown in FIG. 2. FIG. 4B is a cross-sectional view taken along line 4B-4B of FIG. 4A.

As shown in FIG. 4A and FIG. 4B, the horizontal portion 39 has the spacer portions 40 projecting downwardly therefrom. The spacer portion 40 has a lower end 40a abutting on an upper surface 18a of the lower end portion 18 of the front bumper face 15. The spacer portion 40 has a height S. The height S of the spacer portion 40 is a distance of the clearance 43 between the horizontal portion 39 of the under cover 23 and the lower end portion 18 of the front bumper face 15.

The spoiler 21 is made from, for example, rubber. The spoiler 21 includes the mounting portion 27 capable of being mounted within the clearance 43, a spoiler body 28 extending vertically downwardly from a rear edge 27a of the mounting portion 27, and the locking lugs 29 extending rearwardly from the rear edge 27a of the mounting portion 27.

The mounting portion 27 is plate-shaped and has a thickness t. The mounting portion 27 has the plural fitting holes 44 through which the spacer portions 40 can be fitted. Each fitting hole 44 is, for example, elongated, as shown in FIG. 3, to allow for manufacturing tolerances of the spacer portions 40 to ensure that the spacer portion 40 is fitted through the fitting hole 44.

The thickness t of the mounting portion 27 is set to be equal to or slightly smaller than the distance S of the clearance 43. Thus, after the spacer portions 40 are fitted through the fitting holes 44 of the mounting portion 27, the lower ends 40a of the spacer portions 40 are abutted on the upper surface 18a of the lower end portion 18 of the front bumper face 15. With this arrangement, it is ensured that the mounting portion 27 is mounted within the clearance 43 between the horizontal portion 39 of the under cover 23 and the lower end portion 18 of the front bumper face 15.

The locking lugs 29 of the spoiler 21 are inserted through the locking hole portions 46. In this state, the clips 25 are inserted through the mounting holes 42 of the lower end portion 18 and the through-holes 41 of the spacer portions 40 to fasten together the lower end portion 18 of the front bumper face 15 and the horizontal portion 39 of the under cover 23. The mounting portion 27 is sandwiched between the lower end portion 18 of the front bumper face 15 and the horizontal portion 39 of the under cover 23. The spoiler body 28 is retained extending downwardly from between the lower end portion 18 of the front bumper face 15 and the vertical portion 38 of the under cover 23.

By virtue of the spoiler body 28 extending downwardly, air flow around the vehicle body during the running of the vehicle can be changed into a preferred state.

Figure 5:
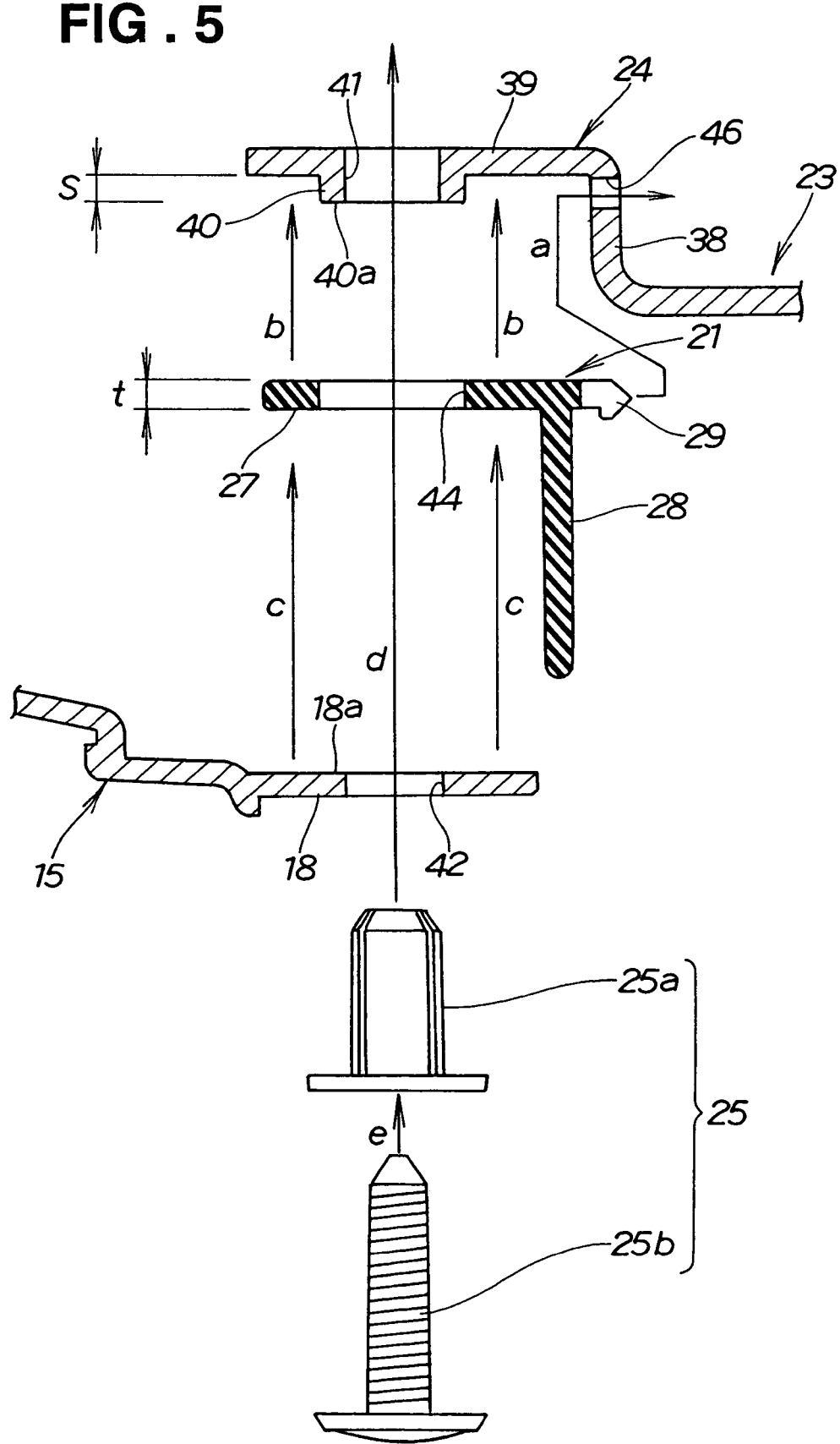
FIG. 5 is a view showing a manner of mounting the spoiler to the front bumper face and the under cover.

Next, description will be made as to a manner for mounting the spoiler 21 to the front bumper face 15 and the under cover 23, with reference to FIG. 5.

First, the locking lugs 29 of the spoiler 21 are locked to the locking hole portions 46 by being inserted through the locking hole portions 46 of the under cover 23, as indicated by an arrow a.

Then, the mounting portion 27 is brought to the horizontal portion 39, as shown by arrows b, b, to allow the spacer portions 40 to be fitted through the fitting holes 44. More specifically, the mounting portion 27 is swung on the locking lugs 29 towards the horizontal portion 39 to allow the spacer portions 40 to be fitted through the fitting holes 44 of the mounting portion 27.

Next, the lower end portion 18 of the front bumper face 15 is brought into abutment against the mounting portion 27, as shown by arrows c, c, whereupon the lower end portion 18 abuts against the lower ends 40a of the spacer portions 40, too. Each of the mounting holes 42 of the lower end portion 18 is coaxial with the through-hole 41 of the spacer portion 40.

Finally, as indicated by an arrow d, base portions 25a of the clips 25 are inserted through the mounting holes 42 of the lower end portion 18 and the through-holes 41 of the spacer portions 40, after which lock portions 25b of the clips 25 are inserted into the base portions 25a, as shown by an arrow e.

Through the above operations, the lower end portion 18 of the front bumper face 15 is fastened to the horizontal portion 39 of the under cover 23 with the mounting portion 27 of the spoiler 21 sandwiched between the lower end portion 18 and the horizontal portion 39.

As explained with reference to FIG. 5, the locking lugs 29 of the spoiler 21 are brought into locking engagement with the locking hole portions 46 of the under cover 23, after which the mounting portion 27 of the spoiler 21 is swung on the locking lugs 29 towards the horizontal portion 39 to allow the spacer portions 40 to be fitted through the fitting holes 44 of the mounting portion 27. Thus, the mounting portion 27 of the spoiler 21 can be easily mounted between the horizontal portion 39 of the under cover 23 and the lower end portion 18 of the front bumper face 15.

Figure 6:
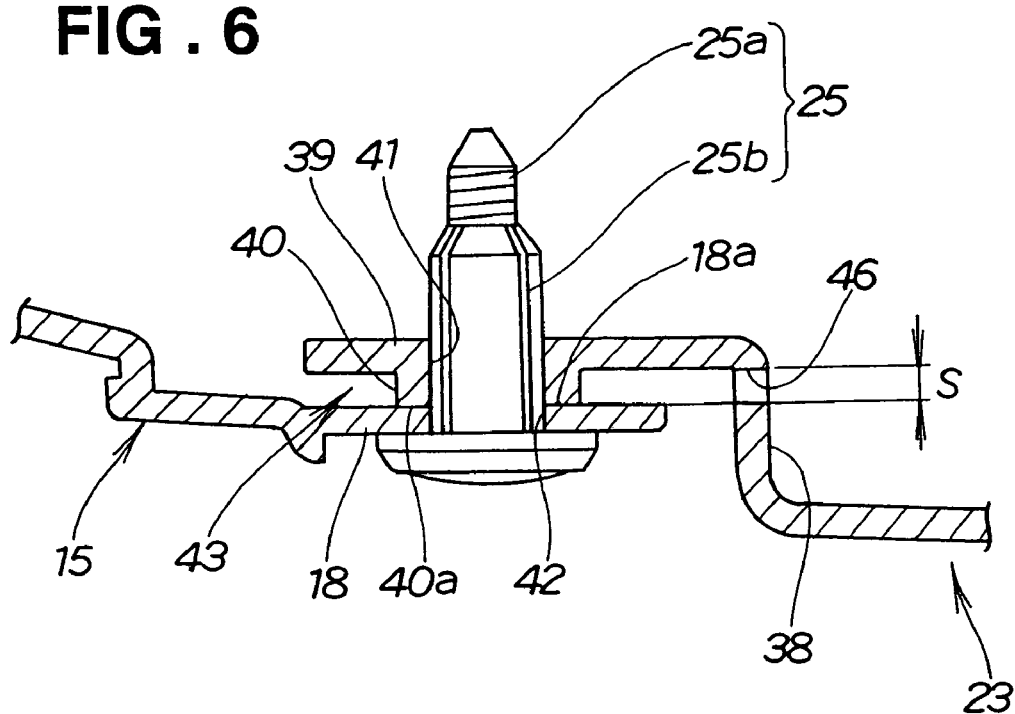
FIG. 6 is a cross-sectional view of the front bumper face and the under cover fastened together, with the spoiler removed.
Figure 7:
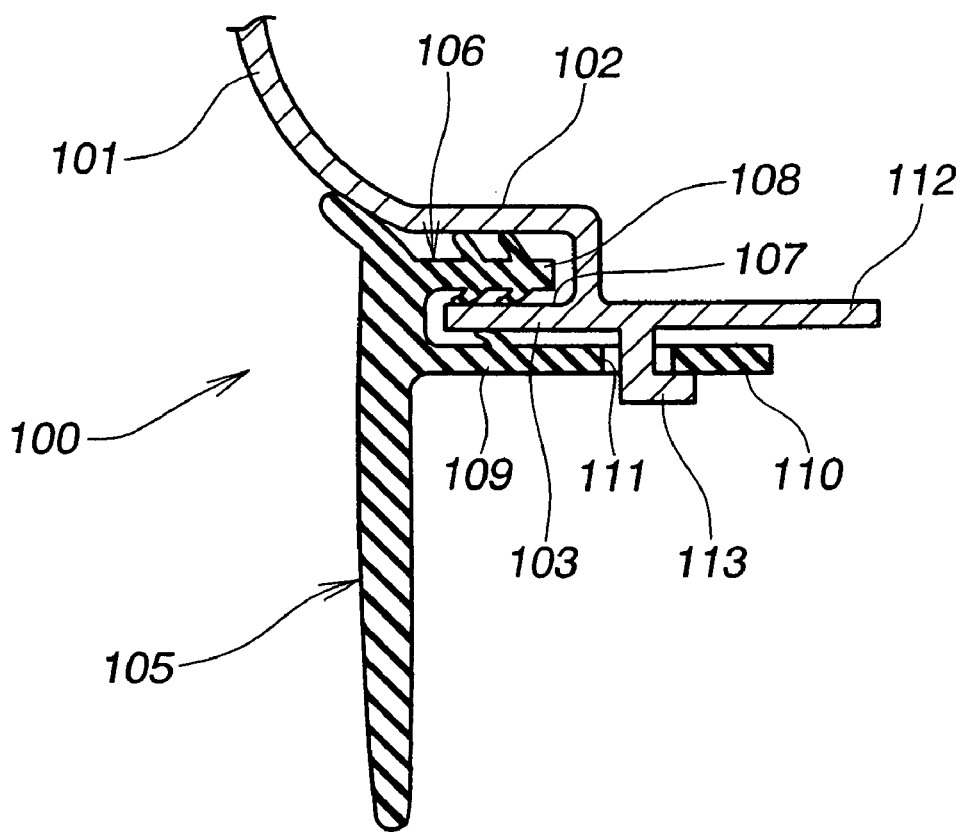
FIG. 7 is a cross-sectional view of a conventional spoiler mounting structure.
Figure 2:
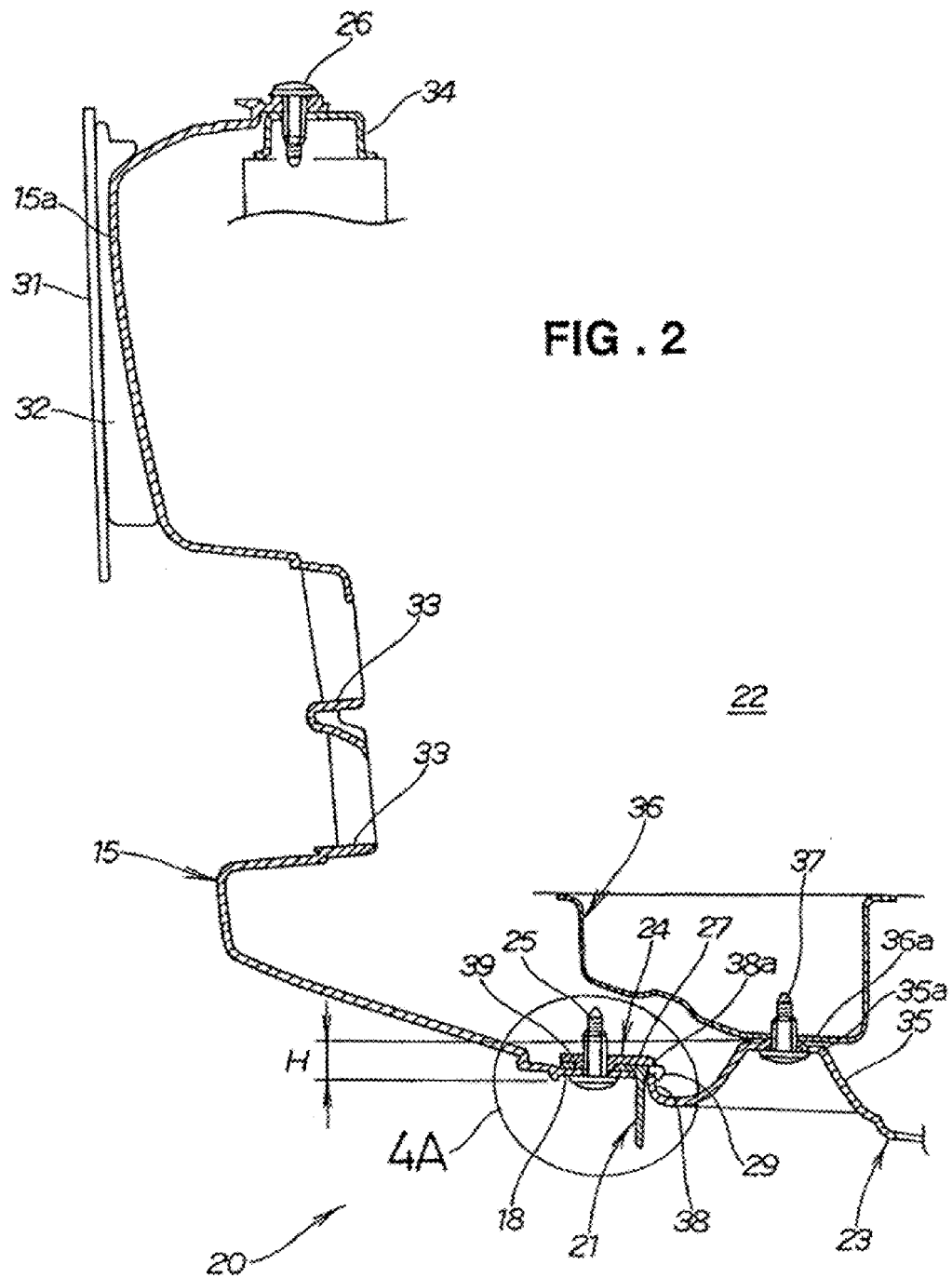

FIG. 6 shows the bumper face fastening structure of the present invention with the spoiler 21 removed.

The lower end portion 18 of the front bumper face 15 abuts on the lower ends 40a of the spacer portions 40. The mounting holes 42 of the lower end portion 18 are coaxial with the through-holes 41 of the spacer portions 40. The clips 25 are inserted through the mounting holes 42 of the lower end portion 18 and the through-holes 41 of the spacer portions 40 to thereby fasten the lower end portion 18 of the front bumper face 15 to the horizontal portion 39 of the under cover 23.

In the above bumper face fastening structure 20, the spacer portions 40 are formed at the front end part 24 (more specifically, the horizontal portion 39 of the front end part 24) of the under cover 23.

The spacer portions 40 space the horizontal portion 39 of the under cover 23 from the lower end portion 18 of the front bumper face 15 to define the predetermined clearance 43 therebetween.

The mounting portion 27 of the spoiler 21 is retained within the clearance 43 by the spacer portions 40 being fitted through the fitting holes 44 of the mounting portion 27.

For a vehicle equipped with the spoiler 21, the spoiler 21 is mounted to the lower end portion 18 of the front bumper face 15 with the mounting portion 27 of the spoiler 21 retained between the horizontal portion 39 of the under cover 23 and the lower end portion 18 of the front bumper face 15.

For a vehicle not equipped with the spoiler 21, the spacer portions 40 space the horizontal portion 39 of the under cover 23 from the lower end portion 18 of the front bumper face 15 to define the clearance 43 therebetween. Thus, the vehicle not equipped with the spoiler 21 can use the same front bumper face 15 and under cover 23 as the vehicle equipped with spoiler 21.

Thus, the front bumper face 15 and the under cover 23 can be commonly used in both the vehicle equipped with the spoiler 21 and the vehicle not equipped with the spoiler 21.

In the bumper face fastening structure 20, the lower end portion 18 of the front bumper face 15 extends in a rearward direction of the vehicle body and is disposed under the horizontal portion 39 of the under cover 23. The clearance 43 between the horizontal portion 39 of the under cover 23 and the lower end portion 18 of the front bumper face 15 is defined inside the vehicle body. Namely, the clearance 43 between the horizontal portion 39 of the under cover 23 and the lower end portion 18 of the front bumper face 15 is hidden by the front bumper face 15. Thus, the vehicle 10 provides enhanced outer appearance.

In the bumper face fastening structure 20, the mounting portion 27 of the spoiler 21 is retained between the lower end portion 18 of the front bumper face 15 and the horizontal portion 39 of the under cover 23 by the spacer portions 40 being fitted through the fitting holes 44 of the mounting portion 27. The mounting portion 27 can be formed from a single plate and hence the spoiler 21 is simply formed.

Although the spacer portions 40 are provided on the horizontal portion 39 (the front end part) of the under cover 23 in the preferred embodiment of the present invention, the same advantageous results can be obtained even if the spacer portions 40 are provided on the lower end portion 18 of the front bumper face 15 and interposed between the horizontal portion 39 of the under cover 23 and the lower end portion 18 of the front bumper face 15.

Obviously, various minor changes and modifications of the present invention are possible in the light of the above teaching. It is therefore to be understood that within the scope of the appended claims the invention may be practiced otherwise than as specifically described.

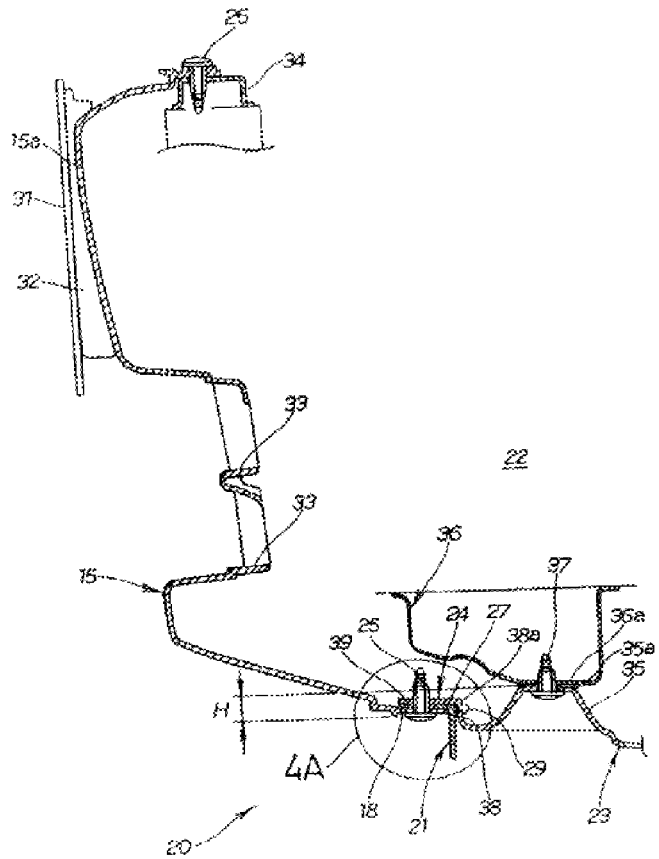

What is claimed is:

1. A bumper face fastening structure comprising:

an under cover provided in a lower part of an engine compartment;

a bumper face having a lower end portion disposed in overlapping relation to a front end part of the under cover;

fasteners for fastening together the front end part of the under cover and the lower end portion of the bumper face;

spacer portions provided between the front end part of the under cover and the lower end portion of the bumper face and having through-holes formed therein for allowing the fasteners to be inserted through the through-holes;

an under spoiler removably mounted between the front end part of the under cover and the lower end portion of the bumper face; and the fasteners designed to be inserted through the through-holes for fastening together the front end part of the under cover and the lower end portion of the bumper face with a clearance defined between the front end part of the under cover and the lower end portion of the bumper face, the spoiler having a mounting portion located in the clearance, the spacer portions being fitted through fitting holes formed in the mounting portion of the spoiler to retain the mounting portion of the spoiler in the clearance.

2. A bumper face fastening structure according to claim 1, wherein the lower end portion of the bumper face extends in a rearward direction of a vehicle body and is located below the front end part of the under cover.

3. A bumper face fastening structure according to claim 1, wherein the spoiler includes locking lugs, and the under cover has locking holes formed therein for allowing the locking lugs to be inserted through the locking holes.

* * * * *

UNITED STATES PATENT AND TRADEMARK OFFICE
CERTIFICATE OF CORRECTION

| | | |
|---|---|---|
| PATENT NO. | : 7,222,894 B2 | Page 1 of 3 |
| APPLICATION NO. | : 11/175416 | |
| DATED | : May 29, 2007 | |
| INVENTOR(S) | : Suwa | |

It is certified that error appears in the above-identified patent and that said Letters Patent is hereby corrected as shown below:

In the Drawings, Sheet 2 of 6, FIG. 2 was amended to remove reference number 36b, please replace Sheet 2 of 6 with the attached sheet.

Signed and Sealed this

Twentieth Day of January, 2009

JON W. DUDAS
*Director of the United States Patent and Trademark Office*

United States Patent
Suwa

(10) Patent No.: US 7,222,894 B2
(45) Date of Patent: May 29, 2007

(54) BUMPER FACE FASTENING STRUCTURE

(75) Inventor: Takaki Suwa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 169 days.

(21) Appl. No.: 11/175,416

(22) Filed: Jul. 6, 2005

(65) Prior Publication Data
US 2006/0017311 A1    Jan. 26, 2006

(30) Foreign Application Priority Data
Jul. 21, 2004 (JP) .................. 2004-213196

(51) Int. Cl.
B60R 19/02 (2006.01)
(52) U.S. Cl. ............................................. 293/102
(58) Field of Classification Search ............... 293/102, 293/154, 155
See application file for complete search history.

(56) References Cited

U.S. PATENT DOCUMENTS 4,074,891 A * 12/1990 Furuta .................... 293/184
6,803,064 B2 * 5/2005 Sasou .................... 293/132

FOREIGN PATENT DOCUMENTS

JP    2003-341561    12/2003

* cited by examiner

Primary Examiner—H Gutman
(74) Attorney, Agent, or Firm—Rankin, Hill, Porter & Clark LLP

(57) ABSTRACT

A fastening structure is provided which mounts a spoiler between a front bumper face and an under cover. The front bumper face has a lower end portion disposed in overlapping relation to a front end part of the under cover such that the lower end portion of the front bumper face is located below the front end part of the under cover. Downwardly projecting spacer portions are formed on an under surface of the front end part. When the lower end portion of the front bumper face and the front end part of the under cover overlap each other, the lower end portion of the front bumper face and the front end part of the under cover are spaced from each other by the spacer portions to define a clearance therebetween. The spoiler has a mounting portion retained in the clearance 3 Claims, 6 Drawing Sheets